Nov. 21, 1944. C. L. THOMAS 2,363,025
CATALYTIC CONVERSION OF HYDROCARBONS
Filed Sept. 13, 1941
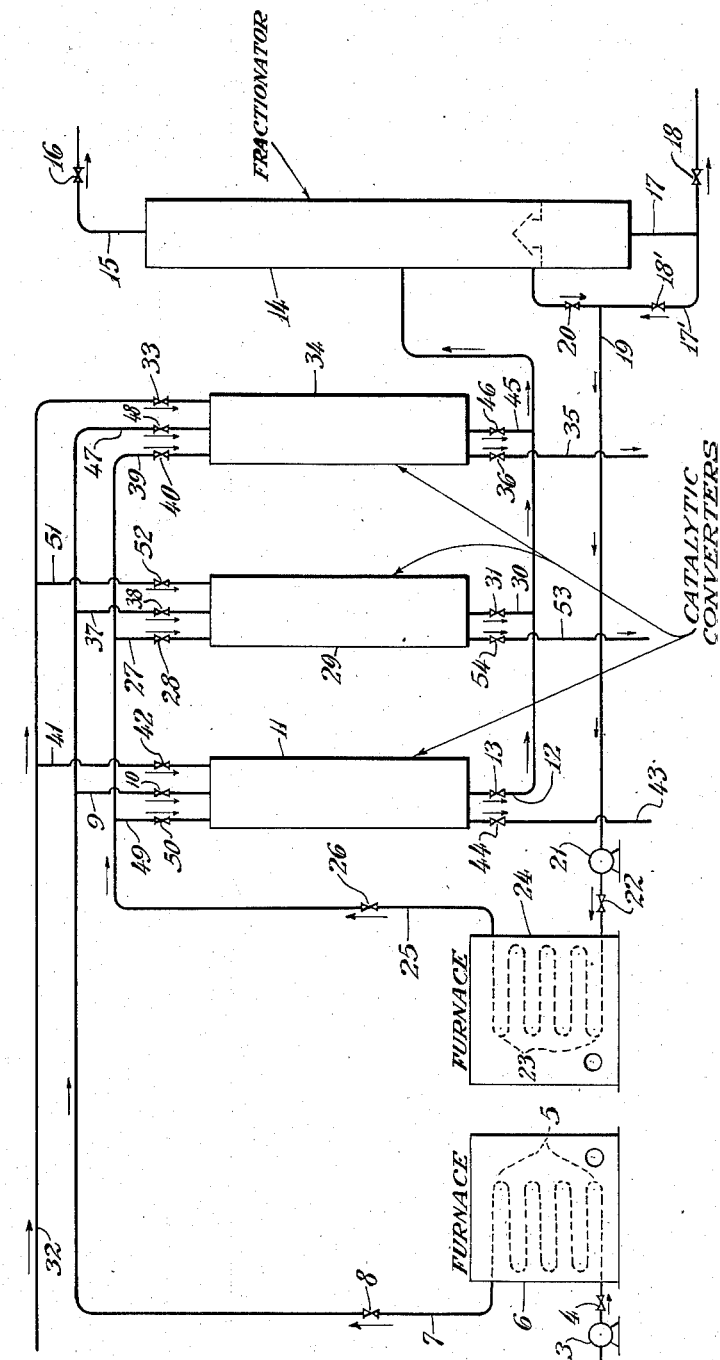
Inventor:
Charles L. Thomas
By Lee J. Gary
Attorney.

Patented Nov. 21, 1944

2,363,025

UNITED STATES PATENT OFFICE 2,363,025

CATALYTIC CONVERSION OF HYDROCARBONS

Charles L. Thomas, Chicago, Ill., assignor to Universal Oil Products Company, Chicago, Ill., a corporation of Delaware Application September 13, 1941, Serial No. 410,760

2 Claims. (Cl. 196—52)

This is a continuation-in-part of my co-pending application Serial No. 279,688, filed June 17, 1939.

This invention relates to a process for the catalytic cracking of petroleum fractions boiling above the range of gasoline and more particularly petroleum distillates which are vaporizable without substantial decomposition. More specifically the invention concerns the conversion of hydrocarbons by means of cracking catalysts which are specific in their reaction of producing desirable gasoline and gaseous products from heavier hydrocarbon distillates.

The catalysts used in the present invention include such types of cracking catalysts as those produced by the chemical treatment of natural occurring substances such as clays and the synthetic gel catalysts prepared by compositing chemically precipitated and purified silica with alumina, zirconia, thoria, or various combinations of silica with these three oxides. These synthetic masses are prepared by various methods such as mixing of the separately prepared constituents or by their coprecipitation. The alkali ions present are removed by washing as their presence decreases the stability of the catalyst when subjected to elevated temperatures. The ratio of the components of these catalysts may be considerably varied although the major proportions of the composite is made up of silica with the minor proportion of alumina with or without zirconia and thoria. The catalysts are used in the form of sized particles or formed shapes such as produced by compression or extrusion methods. The formed particles after drying are calcined at temperatures above 800° F. prior to being subjected to contact with the hydrocarbons. The character of the catalysts varies somewhat upon the exact method of preparation and the composition used.

The catalysts when subjected to contact with the hydrocarbons under cracking conditions of temperature and pressure become contaminated with carbonaceous deposits which must be removed to restore the activity of the catalyst. This reactivation is carried out by contacting the catalyst with an oxygen containing gas at elevated temperatures whereby the carbonaceous deposit on the catalyst is removed. The temperatures at which the reactivation is carried out are usually somewhat above 900° F. and in practice does not usually exceed 1300–1400° F. The activity of the catalyst varies greatly depending upon the carbonaceous material deposited on it the freshly reactivated catalyst possessing a high degree of activity, this activity decreasing as the length of the process period increases.

The susceptibility of the high boiling hydrocarbons to cracking in the presence of a catalyst varies greatly with the hydrocarbon type, the olefins probably being the most susceptible in cracking while the aromatic hydrocarbons are very refractory. When a complex material such as a gas oil is subjected to contact with the cracking catalyst the substances most susceptible to cracking are, of course, converted to a greater extent leaving a recycle fraction which is much less susceptible to further processing than the original charging stock.

In the process of my invention the virgin charging stock is contacted with the catalyst which has previously been used in the cracking of a recycle fraction and which is consequently less effective than a freshly regenerated catalyst. The temperature used in the cracking of the virgin oil varies from about 900° to 1100° F., while using a pressure which is mildly superatmospheric. The recycle stock obtained in the process is cracked by means of a freshly regenerated catalyst using a temperature within the approximate limits of 600–900° F. The pressure used in cracking the recycle stock may be as much as several hundred pounds per square inch. The gasoline formed in the cracking of the recycle stock has a low bromine number and a rather high susceptibility to the increase of octane number with the addition of tetraethyl lead.

In one specific embodiment the present invention comprises a process for catalytically cracking hydrocarbon distillates to produce substantial yields of gasoline which comprises contacting such distillates under conditions adequate to effect substantial conversion thereof with a granular catalyst contained in a primary chamber and previously used to convert intermediate recycle stocks hereinafter described, fractionating the conversion products to separate normally gaseous products, gasoline and said intermediate recycle stocks, contacting said recycle stocks with a freshly reactivated granular catalyst in a secondary chamber under conditions adequate to produce a gasoline with a low degree of unsaturation, fractionating the products from the secondary chamber to recover the gasoline and the remaining portion of insufficiently converted higher boiling hydrocarbons.

The accompanying drawing illustrates diagrammatically one embodiment of the invention. The drawing has not been made to scale and no attempt has been made to proportionate the various part of the equipment exactly. The invention should not be construed as limited to the exact apparatus or conditions given herein.

Referring to the drawing, the original petroleum fraction enters the system through line 1, valve 2, pump 3, valve 4 and coil 5 which is disposed in furnace 6. The oil is heated to a temperature which may vary from about 900° to about 1100° F. and leaves the furnace through line 7, valve 8 and then passes through line 9, valve 10 into catalytic converter 11. The reaction products pass through line 12, valve 13 to fractionator 14. The gasoline and gas pass through line 15 and valve 16 to suitable stabilizers and condensers, etc. which are not shown. A portion of the insufficiently converted oil may be withdrawn from the system by way of line 17, valve 18 to storage. Another portion of the insufficiently converted oil which is recycled for further conversion is passed through line 19, valve 20, pump 21, valve 22 to coil 23 which is disposed in furnace 24.

As an alternate operation, all or part of the insufficiently converted fraction may be withdrawn from fractionator 14 through line 17 and line 17' which contains valve 18' to line 19 and then by previously described routes to coil 23 and the catalytic cracking step. At the same time a portion of the oil is withdrawn from the system through line 17 and valve 18. In coil 23 the recycle oil is heated to a temperature which may vary from about 600° to about 900° F. while utilizing pressures which may vary from mildly superatmospheric to several hundred pounds per square inch.

The heated recycle oil passes through line 25, valve 26, line 27 and valve 28 into catalytic converter 29. The converted oil leaves the converter through line 30, valve 31, passing through line 12 into fractionator 14 together with the oil from converter 11.

During this period of operation the regenerating gases enter the system through line 32 and valve 33, passing into converter 34 therein oxidizing the carbonaceous materials deposited on the catalyst, the spent regenerating gases being removed through line 35 and valve 36. When the period of regeneration for converter 34 is complete, the valves are switched so that the petroleum fraction from line 7 is conducted into converter 29 by means of line 37, valve 38. The recycle oil from line 25 is passed into catalytic converter 34 by means of line 39 and valve 40. The regeneration gases from line 32 are passed into catalytic converter 11 by means of line 41, valve 42. The spent regenerating gases leave converter 11 through line 43 and valve 44. The conversion products from converter 29 and converter 34 are gathered in line 12 from lines 30 and 45 and valves 31 and 46. Simultaneously after regeneration of the catalyst in converter 11 is complete, the original petroleum fraction is switched into converter 34 by means of line 47, valve 48. The recycle oil is passed into converter 11 by means of line 49 and valve 50 and the regeneration gases from line 32 enter converter 29 by means of line 51 and valve 52. The spent regeneration gases leave converter 29 through line 53 and valve 54. The products are collected from converter 11 and 34 by means of line 12 and 45 and valves 13 and 46. Thus each converter in a single cycle passes through the individual steps of regeneration, cracking of recycle oil and cracking of the original fraction in the order named.

Since the recycle oil and original fraction are heated in separate furnaces, the temperature at which they are converted may be controlled as desired. The various heat exchanges, coolers, condensers, stabilizers, gas circulation and equipment which are necessary to the operation of the process but are not a specific feature of the invention are not shown in the interest of simplifying the drawing.

The following example is given to illustrate the applicability of the process and should not be interpreted as being limited to the exact conditions given therein.

A Pennsylvania gas oil of 37.3 A. P. I. gravity was cracked according to the above described invention. The catalyst used was a synthetic silica mass containing a minor proportion of aluminum and zirconium. The temperatures used for cracking the original petroleum fraction was 975° F. and that for the recycle stock was 800° F. The reactivation is carried out by means of a mixture of air and flue gas having an oxygen concentration of about 3 per cent. The temperature of reactivation does not exceed 1300° F. The yield of 400 end point gasoline based on the original charge and including that obtained by the polymerization of the $C_3$ and $C_4$ olefins from the process gases amounts to about 84 per cent of the original charge. The octane number of this gasoline is about 79 CFR motor method.

I claim as my invention:

1. The process of catalytically cracking hydrocarbon oils which comprises effecting the cracking of recycle oil in the presence of freshly regenerated catalyst, employing said catalyst to promote the cracking of said recycle oil until its activity is reduced by the deposition of deleterious heavy conversion products on the catalyst, and thereafter employing the partially spent catalyst to promote the cracking of a virgin oil at a temperature higher than that employed for cracking said recycle oil.

2. The hydrocarbon conversion process which comprises cracking virgin charging oil in the presence of partially spent cracking catalyst derived as hereinafter described, fractionating resulting cracked vapors to separate selected low boiling fractions therefrom and obtain recycle oil comprising higher boiling components thereof, regenerating catalyst which has been employed in the cracking of said virgin oil, cracking said recycle oil in the presence of the regenerated catalyst, and thereafter employing resulting partially spent catalyst from the recycle oil cracking step, without intermediate regeneration, to promote said virgin oil cracking operation, the process being further characterized by the use of a higher cracking temperature in the virgin oil cracking step than that employed for cracking said recycle oil.

CHARLES L. THOMAS.